Aug. 15, 1961 P. HUSKA 2,996,049
OPERATING MECHANISM FOR VALVES AND THE LIKE
Filed Dec. 15, 1958
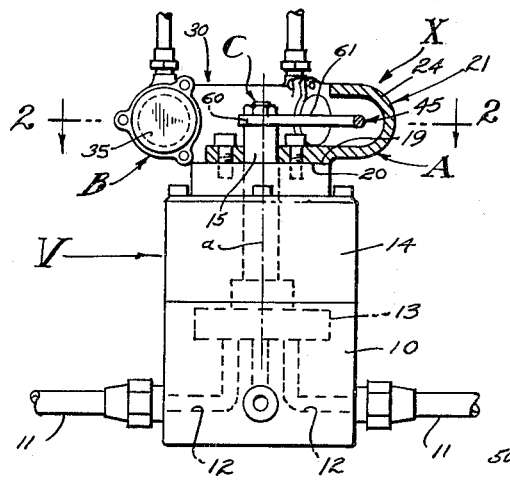
FIG. 1.
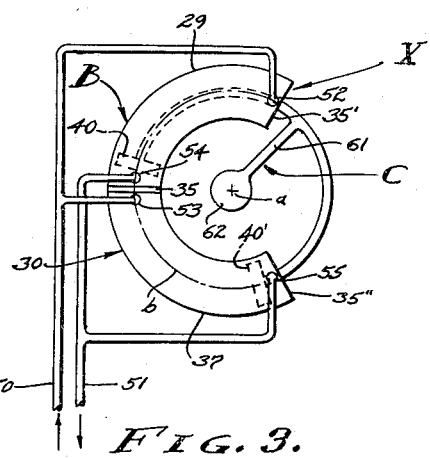
FIG. 3.
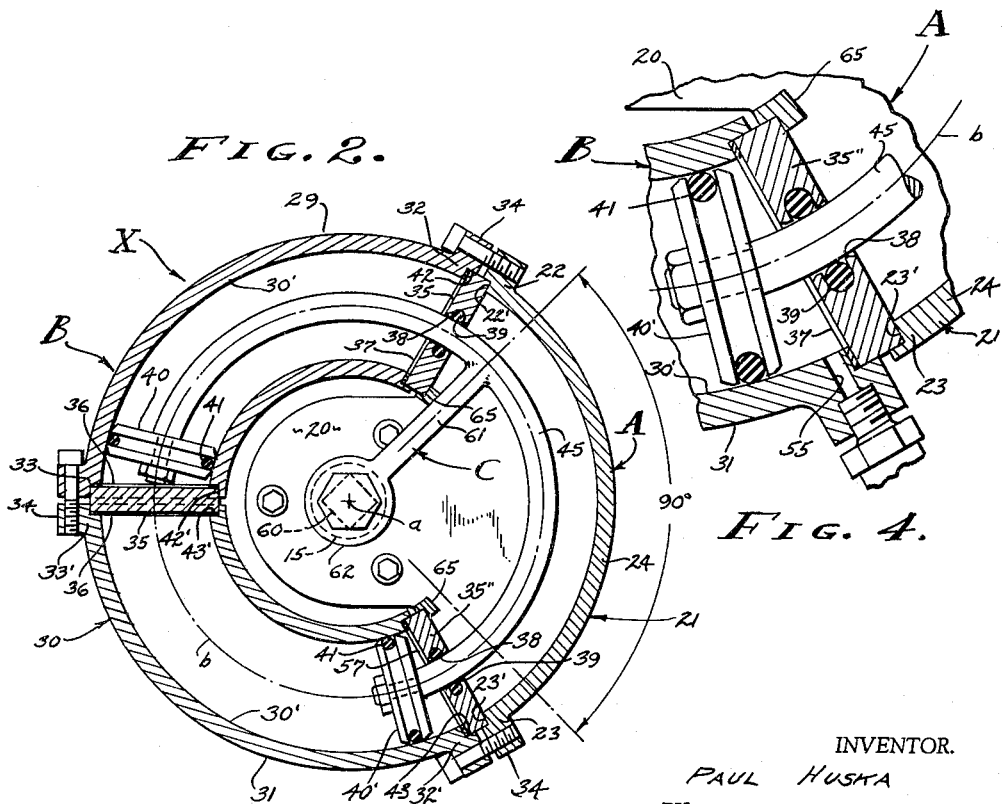
FIG. 2.
FIG. 4.
INVENTOR.
PAUL HUSKA
BY
Wm. H. Maxwell
AGENT

United States Patent Office 2,996,049
Patented Aug. 15, 1961

2,996,049
OPERATING MECHANISM FOR VALVES AND THE LIKE
Paul Huska, 739 Moreno Ave., Los Angeles, Calif.
Filed Dec. 15, 1958, Ser. No. 780,539
2 Claims. (Cl. 121—97)

This invention relates to an operating mechanism and is particularly concerned with a device for operating an element by a movement through a cycle of operation and to position said element between said cycles of operation, it being a general object of this invention to provide a compact and reliable operating mechanism for a device, such as, for example, a valve, or the like, wherein a control element is operated between predetermined positions.

There are many instances where devices are used and require operation of control elements in order to govern their functioning. In a great many instances such devices are controlled by turning a shaft-like element to predetermined rotative positions, for example, from right to left, or visa-versa, through an arc of a predetermined number of degrees. In the case of valves, it is common to revolve a stem 90° between open and closed positions, or between positions directing the flow of fluid through predetermined flow lines. In any case, the mechanism that is controlled functions as desired to rotate or reciprocate an element upon selective positioning of the said rotary control element.

In mechanisms of the type hereinabove referred to manual operation is the usual mode employed in selectively positioning control element, for example, the rotary control element. In cases, however, where remote control is desired difficulties are encountered in the provision of suitable machine structure adapted to selectively operate and position the control element. Electrically actuated solenoid operated structures are used, but with limitations as to size and reliability. Motor operated, electric or fluid, structures are also used, but with attendant complexity and bulk. In other words, the usual operating structures are cumbersome and/or limited in capacity to operate mechanisms of any appreciable size.

In view of the foregoing, it is an object of this invention to provide a mechanism for operation of a control element and which is both compact and adapted to be made of substantial capacity.

An object of this invention is to provide a fluid actuated mechanism for the remote operation of a rotary control element and which is adapted to selectively position said element.

It is an object of this invention to provide a double-acting fluid actuated mechanism for remotely controlling a rotary element to selectively operate it between predetermined positions.

It is also an object of this invention to provide a versatile structure of the character hereinabove referred to and that is readily adapted to be installed on devices, such as valves, of any size and capacity.

It is still another object of this invention to provide an operating mechanism of the type under consideration that is practical to manufacture and to operate and which can be relied upon to function when actuated to selectively operate a control element.

The various objects and features of the present invention will be fully understood from the following detailed description of a typical preferred form and application of the invention, throughout which description reference is made to the accompanying drawings, in which:

FIG. 1 is a side elevation of a typical device to be controlled and showing the mechanism that I provide in section and installed in working position upon said device.
FIG. 2 is an enlarged plan section taken as indicated by line 2—2 on FIG. 1. FIG. 3 is a diagrammatic view showing the fluid connections employed in order to actuate the mechanism. FIG. 4 is an enlarged detailed sectional view of a portion of the structure shown in FIG. 2.

In the drawings I have illustrated a typical device to be operated selectively by the operating mechanism that I provide. The device is shown as a selector valve V, for example, a four-way selector valve having a body 10 and a plurality of flow lines 11. The body of the valve is ported as indicated at 12 and rotatably carries a shiftable valve element 13. The valve element 13 is rotatably supported in suitable bearings and is confined to a chamber within the body by means of a bonnet or cap 14. In accordance with the usual valve construction a control element in the form of a shaft-like stem 15 extends from the body 10 and projects through the cap 14 to be manipulated and operated to rotatively position the valve element 13. For example, it is common to revolve the stem 15 and element 13 through an arc of 90°, between selective positions directing the flow of fluid through the lines 11 in a predetermined manner, all as circumstances require. In practice, the valve body includes the ordinary features for positioning of the valve element 13, both relative to the porting and to the fluid seals, etc.

In accordance with the present invention I provide a mechanism in the form of an attachment X for devices having rotary control elements, such as set forth above in connection with a rotary valve V, and other like devices. The attachment X is a unit of construction adapted to be actuated by fluid under pressure and to operate the rotary control element 13. That is, the attachment X is provided to turn the control element between selective rotative positions as determined, for example, by stops within the valve body 10. In the particular embodiment illustrated, the attachment X involves, generally, a frame A, a cylinder and piston drive B, and a coupling means C. The frame A is supported on the device or valve V to be operated and is provided to carry and to guide elements of the drive B, while the drive B is provided to be actuated by fluid under pressure to operate the coupling means C which is connected to the rotating element 13 of the device through the control element 15.

In accordance with the invention, the attachment X is circular in form and is characterized by means A and B that are arcuate in form and configuration and such as to surround the body 10 of the device, or valve V. As clearly shown, the device to be operated involves the control element 15 rotatable on what I will term a central axis $a$, and the means A and B are curved on radii that are concentric with said central axis. In other words, the means A and B are circular means surrounding the central axis $a$, the coupling means C being operatively connected to the control element 15 and to the means B that is actuated by fluid pressure.

As shown, the attachment unit X that I provide is carried on the body 10 of the device at or surrounding, or adjacent the side thereof from which the control element 15 projects, and in the case illustrated, this is the top of the body 10 at, or surrounding, or adjacent the cap 14. Therefore, the frame A is adapted to be supported by the upper portion of the body 10, preferably by the cap 14, and has a base 20 overlying the top 19 of the cap 14 to freely pass the stem or control element 15. The base 20 projects radially of the axis $a$ and has a segmental peripheral portion 21 that is curved concentrically with the axis $a$. In the form of the invention shown, the segmental peripheral portion 21 includes about one-third of a circle or 120°, and in actual practice the extent of the peripheral portion 21 is somewhat less than 120°. The circumferentially spaced ends 22 and 23 are flat oppositely disposed elements with radial faces in planes normal to the mean diameter $b$ of the means B hereinafter described. Said mean diameter $b$ is concentric with the axis $a$ and is coincidental with the line of movement of the operating elements of the means B. As shown, each head 22 and 23 has an opening 22' and 23' therein formed concentric with the mean diameter $b$ and adapted to pass the operating elements of the means B. Further, the portion 21 is in the form of a housing or guard as it extends between the ends 22 and 23 with an outer wall 24 that opens radially inward.

The cylinder and piston drive B is carried by the frame A and involves, generally, a cylinder 30, cylinder heads 35, 35' and 35", pistons 40 and 40' and a piston rod 45. The elements above referred to are arcuately formed concentrically along the mean diameter $b$, and when the combined means A and B are joined in a complete circle, as shown, the structure takes on the general character of a torus. However, the means A and B are segmental in order to facilitate manufacture and in the particular case illustrated where 90° of rotation is required, there are three segments of about 120° each, individually formed and connected together upon assembly. Specifically, there is one segment formed by the frame A, and two segments formed by two like segments 29 and 31, forming the cylinder 30. The circumferentially spaced ends 32 and 33 and 32' and 33' of the sections 29 and 31 are flat oppositely disposed elements with radial faces in planes normal to the mean diameter $b$. Said faces of the ends 32 and 32' are adapted to oppose the faces 22 and 23, while the faces of the ends 33 and 33' are adapted to oppose each other, thereby completing a 360° circle along the mean diameter $b$. As shown, each head 32 and 33, and 32' and 33' has an opening 42 and 43 and 42' and 43' formed concentric with the mean diameter $b$, said openings 42 and 42' being adapted to pass the operating element or rod 45 of the means B.

As illustrated in FIG. 2 of the drawings, the cylinder 30 is sectional, being made up of the segments 29 and 31. The two segments are alike and each involves an arcuately curved cylinder wall 30' formed concentrically with the mean diameter $b$. The ends of the segments are open, the openings 42 and 43 and 42' and 43' being recessed openings, in the nature of counter bores, presenting outwardly faced shoulders or seats. In order to secure the segments of the structure together, I prefer to employ simple tension screw fasteners engaged through ears 34 on the opposed parts to pull them together into tight engagement.

The cylinder heads are essentially alike, there being a head at each end of the two sections 29 and 31 establishing two cylindrical chambers. As shown, there is a cylinder head 35 between the opposed faces of the ends 33 and 33', a head 35' between the opposed faces at the ends 32 and 22, and a head 35" between the opposed faces of the ends 32' and 23. The heads 35, 35' and 35" are plate-like parts and of a diameter to be received in the recessed openings at the ends of the segments, or between the said opposed ends thereof. As shown, the head 35 is imperforate and is sealed with the opposed cylinder segments 29 and 31 by gaskets or seals 36 while the heads 35' and 35" each have an aperture 38 therethrough to slidably pass the rod 45 and are sealed with the cylinder segments respectively by gaskets or seals 37. The apertures 38 are concentric with the mean diameter $b$ and there is an annular groove that opens inwardly to carry an O ring seal 39, or the like, to have sliding sealing engagement with the rod 45. In practice, the entries of the apertures 38, at both sides of the heads 35' and 35" are chamfered, and the apertures 38 are of sufficient diameter to clear the arcuate rod 35 without binding, the rod 45 having engagement with the seals 39.

There are two pistons 40 and 40', one operating in the cylinder section 29 and one operating in the cylinder section 31. The pistons 40 and 40' are disc-shaped parts of a diameter to be slidably engaged with the cylinder walls 30' to operate between the ends of the cylinder. The pistons are alike and each is an imperforate element with an annular groove that opens outwardly at the periphery thereof to carry an O ring seal 41, or the like, to have sliding engagement with the arcuate bore 30' of the cylinder. In practice, the front and back faces of the piston are chamfered at the periphery, the body of the piston being of a diameter to have sufficient clearance in order to avoid binding, the seals 41 having engagement with the cylinder walls 30'.

The piston rod 45 is a curved, or arcuate, element that extends between the two pistons 40 and 40' to be operated thereby. As shown, the rod 45 is formed to extend concentrically with the mean diameter $b$ and is of an arcuate extent to include approximately 240°, the piston 40 being secured to the other end thereof. As above set forth, the rod 45 extends through the apertures 38 in the heads 35' and 35" to be carried by the seals 39 and adapted to reciprocate along the mean diameter $b$ when the pistons 40 and 40' are actuated.

The cylinder and piston drive B, above described, can be single or double acting, it being preferred to supply fluid pressure to opposite ends of the cylinder sections 29 and 31 so that the drive is double acting (see FIG. 3). There is a pair of fluid handling lines 50 and 51 adapted to pass fluid in opposite directions as controlled by a valve (not shown). The line 50 is in communication with the clock-wise ends of the cylinder sections 29 and 31 through ports 52 and 53, while the line 51 is in communication with the counter clock-wise ends of the cylinder sections 29 and 31 through ports 54 and 55. As best illustrated in FIG. 4, the ports enter the cylinder sections adjacent the heads that close the ends thereof. It is to be understood that the drive B can be single acting, in which case, for example, the ports 53 and 54 are supplied by the lines 50 and 51, while the ports 52 and 55 are employed as vents.

The coupling means C operatively connects the rod 45 to the control element 15, so that reciprocation of the rod results in operation of the said element. As is common in valve construction, and as shown, the control element 15 is rotatable and is provided with a coupling portion, for example, a squared upper end portion 60 for keyed reception of an operator. Therefore, the means C involves a part in the form of a lever 61 that has a hub 62 having keyed engagement with the portion 60 of the control element 15. The lever 61 extends radially of the central axis $a$ and joins with the rod 45. As shown, the lever 61 and rod 45 are integrally joined.

When fluid pressure is applied to the line 50 the rod 45 and control element 15 are actuated to be operated in a counter clock-wise direction, and when applied to the line 51 they are actuated to be operated in a clock-wise direction. The limit of reciprocal movement can be established by stops within the device being operated, or as shown, the lever 61 is stopped by abutments 65 on the frame A. It will be apparent that the circumferential travel of the pistons and rod is substantial and that the effective areas of the cylinders can be made reasonably large, all within the limits of a unit of construction little or no larger in diameter than the device and can be operated with little or no increase in height thereof, as clearly illustrated in FIG. 1 of the drawings. It will also be understood how the attachment unit X can be readily applied to devices, such as valves, of any size, to rotate a control element that is employed to shift an element of the device.

Having described only a typical preferred form and application of my invention, I do not wish to be restricted to the specific details herein set forth but wish to reserve to myself any modifications or variations that may appear to those skilled in the art and fall within the scope of the following claims.

Having described my invention, I claim:

1. An operating attachment unit for selectively positioning the rotary control element of a device, and including, a frame supported by said device and having a base projecting radially of said control element and having a segmental peripheral portion with oppositely faced circumferentially disposed ends, a segmental drive cylinder comprising like sections with opposed circumferentially adjoining ends engaged and separated by a head disposed therebetween and the opposite ends thereof being spaced and engaged with the ends of the frame, said segmental peripheral portions of the frame and said sections of the drive cylinder forming a completed circular unit, pistons slidable in the cylinder sections and an arcuate rod extending between and entering the cylinder sections and connected to the pistons therein, and a coupling means comprising a lever extending from the control element and with its end operatively connected with the rod.

2. An operating attachment unit for selectively positioning the rotary control element of a device, and including, a frame supported by said device and having a base projecting radially of said control element and having a segmental peripheral portion with oppositely faced circumferentially disposed ends, a segmental drive cylinder comprising like sections with opposed circumferentially adjoining ends engaged and separated by a head disposed therebetween and the opposite ends thereof being spaced and engaged with the ends of the frame and each closed by a head with an opening therein, said segmental peripheral portions of the frame and said sections of the drive cylinder forming a completed circular unit, pistons slidable in the cylinder sections and an arculate rod extending between and entering the cylinder sections through the openings in the heads and connected to the pistons therein, and coupling means comprising a lever extending from the control element and with its end operatively connected with the rod.

References Cited in the file of this patent

UNITED STATES PATENTS

| | | |
|---|---|---|
| 447,079 | McDonald et al. | Feb. 24, 1891 |
| 2,287,960 | Ballard | June 30, 1942 |
| 2,651,206 | LaVeille | Sept. 8, 1953 |
| 2,780,432 | Shafer | Feb. 5, 1957 |
| 2,936,636 | Wacht | May 17, 1960 |

FOREIGN PATENTS

| | | |
|---|---|---|
| 742,271 | Great Britain | Dec. 21, 1955 |